United States Patent [19]
Bernaerts

[11] 4,170,244
[45] Oct. 9, 1979

[54] PRESSURE TIGHT VALVE SEAT FOR VALVES CONSISTING OF TWO OPPOSING TUBES

[76] Inventor: Henry J. Bernaerts, R.F.D. 10, Box 1610, Laurel La., Annapolis, Md. 21401

[21] Appl. No.: 851,577

[22] Filed: Nov. 15, 1977

[51] Int. Cl.² .......... G05D 16/00
[52] U.S. Cl. .......... 137/83; 91/3
[58] Field of Search .......... 137/83; 91/3

[56] References Cited

U.S. PATENT DOCUMENTS

| | | | |
|---|---|---|---|
| 2,742,919 | 4/1956 | Ray | 91/3 X |
| 2,858,849 | 11/1958 | Griffith | 137/83 X |
| 3,460,436 | 8/1969 | Takeda | 137/83 X |

*Primary Examiner*—Alan Cohan
*Attorney, Agent, or Firm*—R. S. Sciascia; Q. E. Hodges

[57] ABSTRACT

In fluid jet transfer valves comprising two opposing jet tube openings with high pressure fluid flowing out of one opening towards the other, the end surfaces of the jet tubes are provided with a novel shape which allows the tube ends to seal tightly together when they are coaxially aligned with each other and also to be deflected apart without binding. The shape of the end surface on one of the tubes is an inverted reproduction of the surface on the opposing tube so that when the tubes are coaxially aligned with each other and pressed together a tight seal will be formed. The end surfaces on the tubes are shaped so that the tubes may be freely moved laterally relative to each other without binding. The tilt of the end surfaces of the two tubes is minimized so that small lateral closure forces will generate much larger axial seating forces and so that the lateral opening forces created by escaping high pressure fluid are minimized.

7 Claims, 7 Drawing Figures

FIG.6
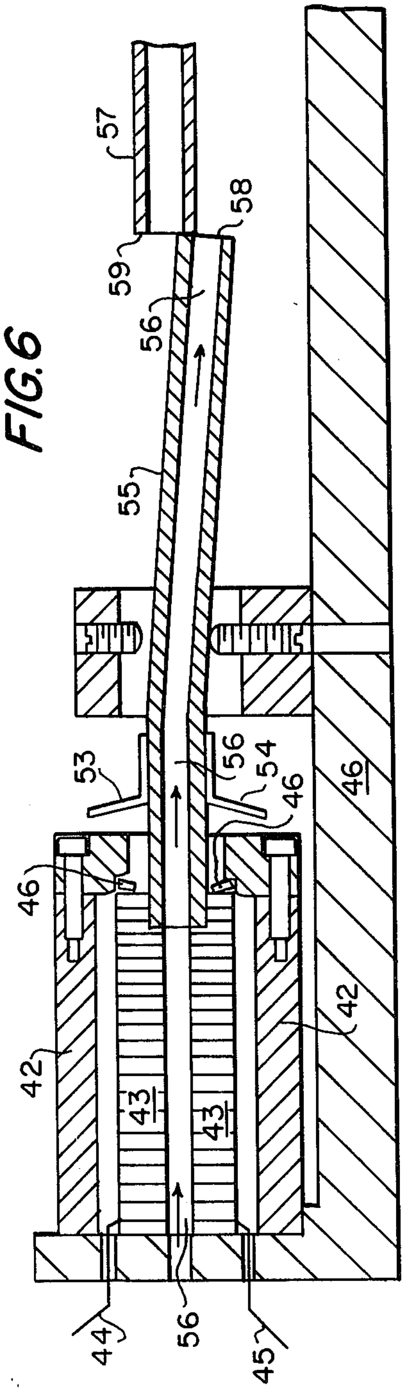
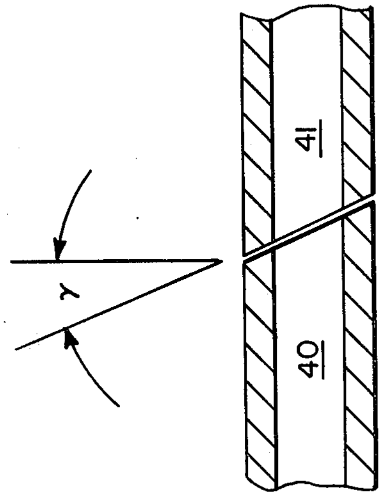
FIG.5
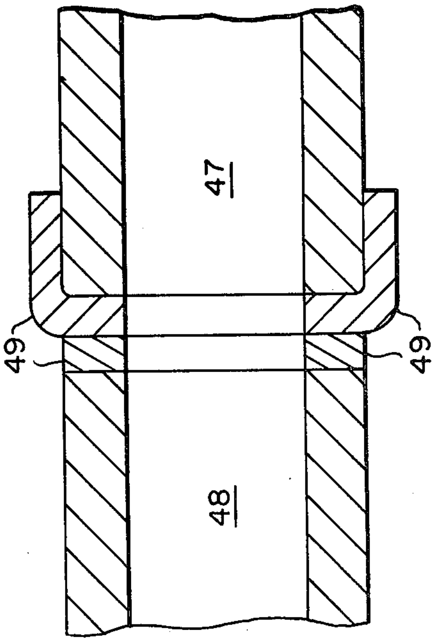
FIG.7

PRESSURE TIGHT VALVE SEAT FOR VALVES CONSISTING OF TWO OPPOSING TUBES

The invention described herein may be manufactured and used by or for the Government of the United States of America for governmental purposes without he payment of any royalties thereon or therefor.

BACKGROUND OF THE INVENTION

This invention relates to fluid jet valves and in particular to valves which comprise two opposing tube openings with high pressure fluid flowing out of one of the tube openings toward the other. The other tube opening may also be in the form of a fixed valve seat or orifice equipped receiver plate. In these valves one or both of the tube openings are movable so that they may be either coaxially aligned with each other or misaligned. A valve of this type is described in detail in the U.S. Pat. No. 3,939,857. In that valve, both of the opposing tube ends are laterally movable by means of piezoelectric actuators which are driven by electric signals. Many other types of electrical or mechanical actuators may also be used to move the opposing tube ends. The tube ends on the valves disclosed in that patent were cut off square so that the surface of each end was perpendicular to the longitudinal axis of the tube. If the two opposing tube ends in that valve were coaxially aligned with each other in positions so close that they were in contact, the tube ends would bind or catch each other when an attempt is made to deflect them laterally apart. Square cut tube ends of this type must be mounted with a large enough separation when they are coaxially aligned with each other so that the tube ends will not bind when they are deflected apart. Because a minimum clearance must always be maintained between the two tube ends, there will always be a considerable leakage of the pressurized fluid flowing through the tubes. The amount of this leakage will depend upon the pressure of the fluid and the amount of clearance between the two opposing tube ends. Regardless of how high the input fluid pressure to the valve may be, the output fluid pressure from the valve will be much lower as long as a great deal of the fluid is leaking out through the gap between the two tube ends. The prior art shows end surfaces on jet valve tubes which are rounded in shape so as to avoid binding when the tube ends are positioned close to another surface. However, these rounded ends are not complementary to each other (male and female) and these these valves do not allow or provide for a tight seal between the movable jet tube end and the opposing jet fluid passage. It would be desirable for the tube ends of these fluid jet valves to form a tight seal while they are coaxially aligned with each other and also to be shaped so that they can be easily deflected apart from each other when it is desired to turn the valve off. It would also be desirable to obtain the tight seal by using small lateral seating forces in such a way as to generate large axial force components which crush contaminants and press the seats together.

OBJECTS OF THE INVENTION

It is therefore an object of this invention to provide a fluid valve comprising two opposing axially fixed tubes wherein the tubes form a tight seal when they are coaxially aligned with each other.

It is also an object of this invention to provide a fluid valve comprising two opposing tubes wherein the tube ends may be deflected apart from each other without catching or binding even though the tube ends fit together to form a tight seal when they are coaxially aligned with each other.

It is also an object of this invention to provide a valve comprising two opposing, cantilevered, laterally deflectable tubes which convert and amplify anti-deflection forces or anti-deflection stresses into large axial forces along the alignment axes, whereby the axial force becomes equal to the cotangent of the average tilt angle times the anti-deflection force.

It is another object of this invention to provide a fluid valve comprising two opposing tubes with tube ends which make a relative seating motion consisting of a combination of a relatively large lateral shear motion and a relatively small axial seating motion.

It is another object of this invention to provide a fluid valve comprising two opposing tubes with tube ends performing the seating and closure motion whereby the actuator motion is approximately perpendicular to the seating force when the tubes are fully aligned so that little if any actuator force has to be maintained when the valve is closed in a fully aligned position.

It is another object of this invention to provide a fluid valve comprising two opposing tubes which minimizes the pressure loss of the fluid flowing through the valve while the tubes are aligned.

SUMMARY OF THE INVENTION

This invention provides for specially shaped end surfaces on the jet tubes of fluid transfer valves which have two opposing jet tubes. The jet tubes end surfaces are tilted so that either one or both of the two tubes may be moved sideways away from each other without binding or catching on each other even though the two tubes are in contact when coaxially aligned with each other. The shape of the surface on the end of one tube is made to be an inverted reproduction of the shape of the opposing tube end surface so that when the two tube ends are coaxially aligned with each other and pressed together they will match up and fit together. A tight seal will thus be formed which will allow very little fluid to leak through the joint between them. This tight seal will minimize the amount of pressure loss of fluid flowing through the valve when the two tube ends are coaxially aligned with each other. In the preferred embodiment, each of the tube ends will have a concave surface over half of the tube end and a convex surface with the same curvature over the other half of the tube end. The positions of the concave halves and convex halves of the surfaces on the opposing tubes are reversed so that the tube openings will match up and fit together tightly. The tube ends in the preferred embodiment will always be deflected apart sideways in opposite directions which face outward from the sides of the tubes. Alternatively, the tube ends may be cut perpendicular, as in the prior art, and forced together by supporting the base end of each cantilevered tube with an axial actuator to form a tight seal at those time when the tube ends are coaxially aligned with each other. Whenever it is desired to deflect the tube ends away from each other in this alternative embodiment, the axial pressure forcing the tube ends together must be released first. This will allow enough clearance between the tube ends so that they may move apart laterally without binding. In any of the embodiments of this invention the seal between the two ends of the tubes may be tightened by covering the end surfaces with an elastic material which is deformable.

BRIEF DESCRIPTION OF THE DRAWINGS

FIG. 5 shows another embodiment of the invention wherein the tube end surfaces are tilted as in FIGS. 1, 2 and 3 but are flat instead of curved.

FIG. 6 shows a variation of the embodiment shown in FIG. 4 wherein a pile of piezoelectric discs is used as the axial separation actuator.

FIG. 7 shows another embodiment of the invention wherein the tube end surfaces are covered with a material which is relatively elastic and deformable relative to the rest of the tube.

DESCRIPTION OF THE PREFERRED EMBODIMENT

The views in FIGS. 1, 2, 3, 4 and 7 illustrate how the novel tube end surfaces of this invention would be used on a fluid jet valve such as, for example, the valve disclosed in U.S. Pat. No. 3,939,857. In that valve, the open ends of two cantilevered tubes are deflected laterally to turn the valve on and off. The tubes are made of a laterally deflectable piezoelectric material so that when a signal is applied, the open tube ends bend laterally apart from each other.

Figure 1:
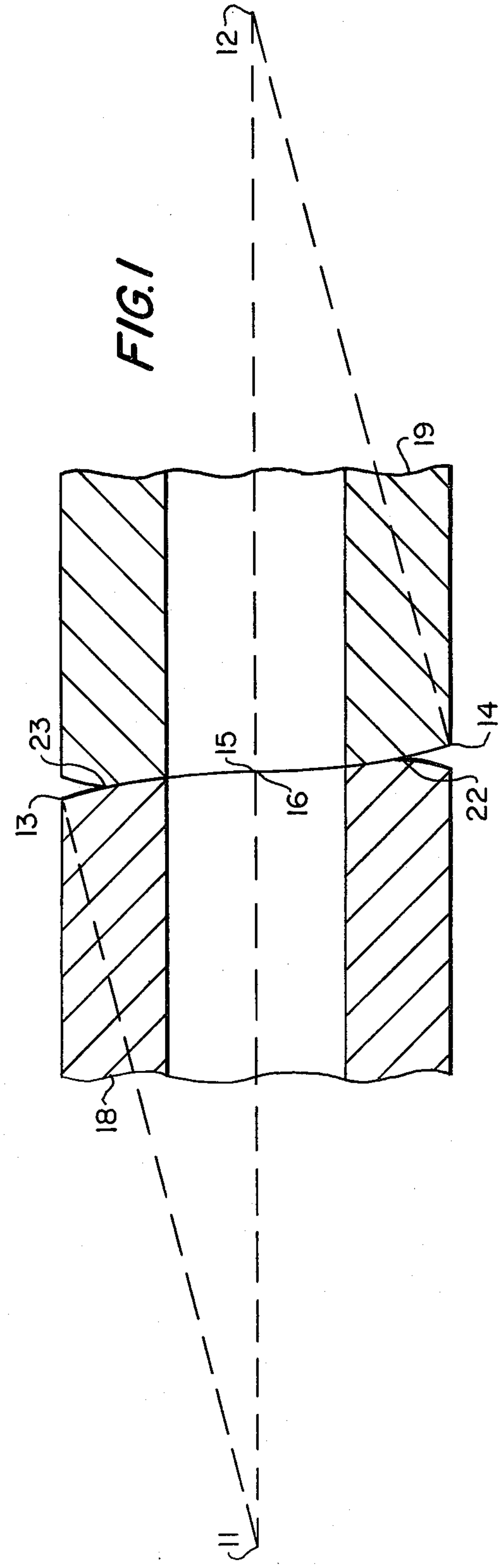
FIG. 1 shows a cross sectional view of two fluid jet valve tube ends which are coaxially aligned with each other and which have the shape of the preferred embodiment of this invention.

In FIG. 1 the ends of two tubes 18 and 19 of a fluid jet valve are shown coaxially aligned with each other and in abutting contact with each other wherein their respective longitudinal axes, as represented by broken lines exending between points 11 and 16 and 12 and 15, are likewise coaxially aligned. The surfaces of the ends of the tubes may be defined as being sections of cylindrical surfaces. That part of the end surface of tube 18 which lies between points 16 and 13 is defined by the intersection between the tube 18 and a cylindrical surface whose central axis passes through pivot point 11. The radius of this cylindrical surface is equal to the distance between point 11 and point 16 which is also equal to the distance between point 11 and point 13. The opposing end surface of tube 19 between points 15 and 23 has the same radius and center of curvature as the surface between points 16 and 13 on tube 18, but is concave instead of convex. The surface on the end of tube 19 between point 15 and point 14 is defined by the intersection between the tube 19 and a cylindrical surface whose central axis passes through point 12. The radius of the cylindrical surface is equal to the distance between the points 12 and 15 which is also equal to the distance between point 12 and 14. Tube 18 is shortest at point 13 and gradually becomes longer across the end of the tube until it reaches its maximum length at point 22. Similarly tube 19 is shortest at point 14 and gradually becomes longer across the end of the tube until it reaches its maximum length at point 23. At points 15 and 16 the seating surfaces are not tilted relative to the tube axes laying along the line 11 to 12.

Figure 2:
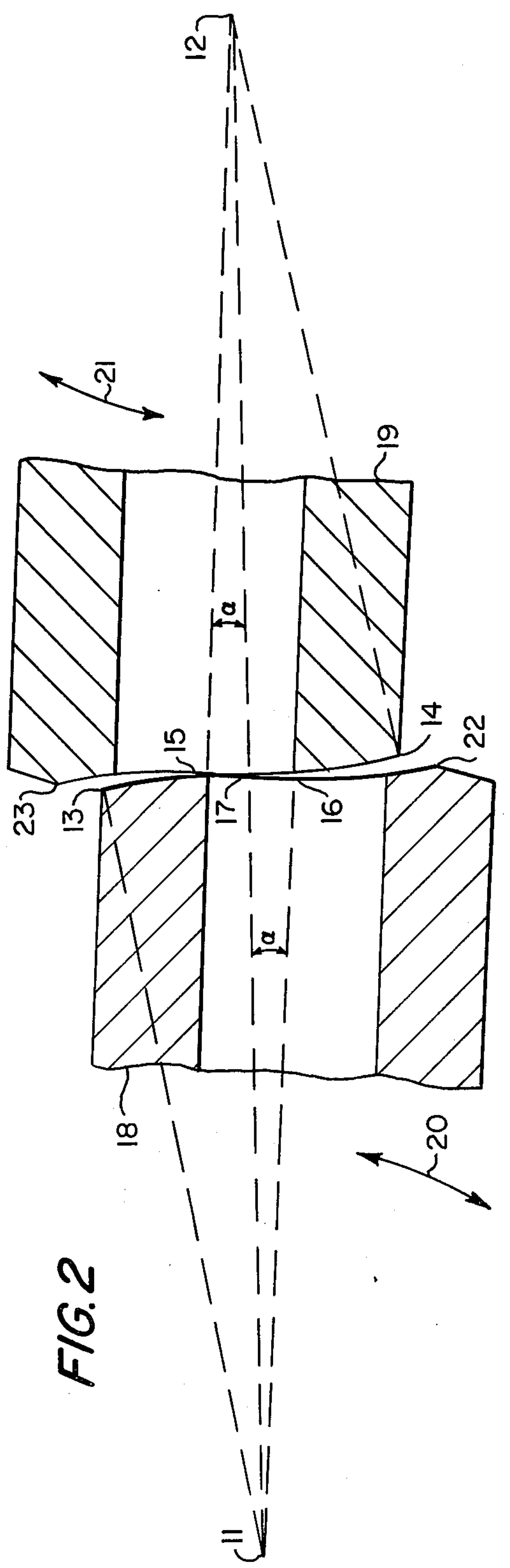
FIG. 2 shows a cross section of the same valve tube ends and as in FIG. 1 but with the tube ends deflected sideways from each other.

The arrows 20 in FIG. 2 show the direction of movement of the end of tube 18 and the arrows 21 show the directions of movement of the end of tube 19. The tube 18 has been deflected downward by an angle $\alpha$ and the tube 19 has been deflected upward by angle $\alpha$.

Figure 3:
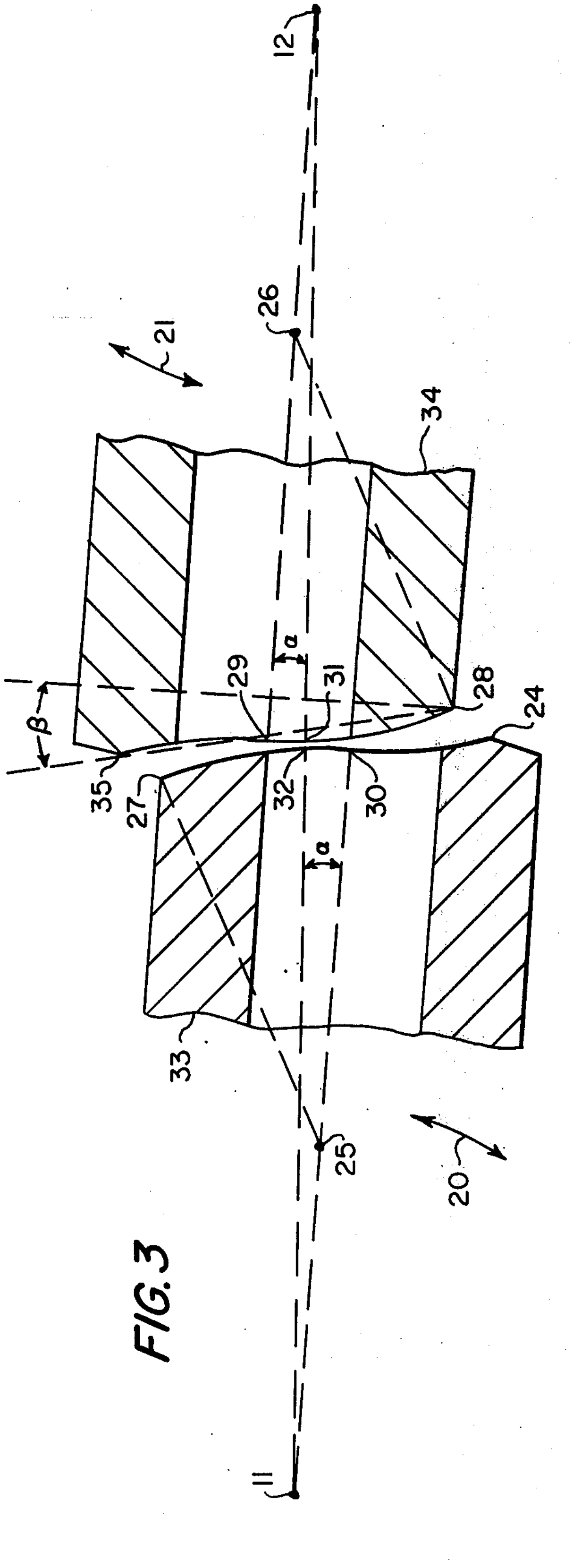
FIG. 3 is like FIG. 2 except that the tube end surfaces have a slightly different curvature.

The view illustrated in FIG. 2 shows the case where the end of tube 19 is being rotated in a circular path about a pivot axis represented by point 12 and the end of tube 18 is being rotated in a circular path about a pivot axis represented by point 11. This circular motion is based on the phenomena that slender cantilevered beams describe an approximately circular motion during relatively small deflections. In FIG. 1 and FIG. 2, the tube ends are rotated in approximately circular paths about points 11 and 12 which are also the points about which the circular end surfaces are curved. In this situation, as long as any portion of the two tubes are opposite each other, the tubes will be substantially in contact with each other. In FIG. 2 the point of contact is at point 17. However, the tubes will not catch each other or bind against each other and they will move freely. If the radii at the tube ends are made slightly shorter than necessary for free sliding the seats will open immediately at point 17 because of the steeper curvature. In FIG. 3, as in FIG. 2, the left tube end 33 has been laterally deflected downward by an angle $\alpha$ in a circular path about point 11 as shown by arrows 20. Similarly, the adjacent ends of tubes 33 and 34 in FIG. 3 are spaced apart and their respective longitudinal axes, as represented by broken lines extending between points 11 and 16 and 12 and 15, are non-aligned. However, the radius of curvature of the cylindrical surfaces on the tube ends is shorter in FIG. 3 than in FIG. 2. That is, the tube ends curvature radii are slightly shorter than the radius of the arc generated by the deflecting cantilevered beams. The surface on the end of tube 33 between the points 27 and 30 is curved about point 25 instead of point 11 as in FIG. 2. The corresponding surface between points 35 and 31 at the end of tube 34 has the same increased curvature. The surface on the end of tube 34 between points 29 and 28 is curved about point 26 in FIG. 3 instead of about point 12 as in FIG. 2. The corresponding surface at the end of tube 33 between points 30 and 24 has the same increased curvature. The effect of decreasing the radius of curvature of the end surfaces of the tubes to be less than the radius of the circular path about which the tubes are moved when deflected is to cause the two tubes to immediately lose contact with each other as soon as they are not completely aligned. Therefore, in FIG. 3, point 32 on tube 33 is not in contact with point 31 on tube 34. It can be seen from FIGS. 2 and 3 that the ends of the two opposing tubes have complementary, contoured end faces which will not bind against each other when they are laterally deflected from their contact position as long as the radius of curvature of the end surfaces is equal to or less than the radius of curvature of the path along which the ends of the tubes move when deflected. However, to avoid binding contact therebetween, the two tube ends must always be deflected away from each other by bending them about axes which are parallel to the axes defining the cylindrical curved tube end surfaces. This will result in the paths of the two tube ends always lying within a single plane surface.

In order to achieve a tight seal between the ends of the two tubes, as shown in FIG. 1, it is necessary that the surface on the end of one tube be complementary to the surface of the end of the opposing tube. The surface on the end of one tube, such as tube 19 in FIG. 1, must be an inverted reproduction of the surface on the end of the opposing tubes, such as tube 18 in FIG. 1.

In order that the two tubes should form a tight seal when they are aligned with each other it is important that the tubes be mounted in such a way that there is no positive clearance between the tube ends while they are aligned. It is desirable to mount the tubes so that there will be a very slight negative clearance between them while coaxially aligned with each other. The amount of this negative clearance should be large enough so as to create a significant amount of force pushing the tubes together while they are aligned, yet at the same time not so great as to cause the tubes to bind against each other. The negative clearance will cause an equal axial deflection of the tube ends as determined by the axial compression of the tubes and elasticity of the tube's supporting frame. This axial deflection of the tube ends will be along a line between points 11 and 12. The tube endings which are illustrated in FIG. 1, 2 and 3 would have hardened and polished surfaces so that the tube endings may easily slide across each other when in contact. However, the same tube end faces could also be made, as shown in FIG. 7, out of an elastic deformable and compressable material which has a very low sheer friction coefficient. By placing an elastic deformable material 49 on the ends of the tubes 48 and 47, a tight seal may still be obtained between the two tubes if the end surface on one is not an exact reproduction of the end surface of the other or if defects, contaminants or scratches occur on one of the end surfaces. When fluid jet valve tubes have tube endings such as illustrated in FIG. 1 through 3, small portions of the end surfaces will slide against each other for a short distance before they finally stop and make a firm seat. The length of this distance will be much shorter in FIG. 3 than in FIGS. 1 and 2. This sliding or wiping action will tend to keep the tube end surfaces cleaned of any material which might tend to hold the tube ends apart. When the tube ends deflect toward each other to close, they cannot easily over travel and pass each other since when they reach the point at which they are exactly aligned with each other, they will hit and stop each other from moving further past such predetermined aligned position. The valve can be set up to exert a continuing closing force which will hold the tube ends tightly closed. A high closing speed of the two tubes ends when they hit and seal against each other while closing will cause rapidly damped vibrations. This rapid damping is a result of low mass inertia, sliding friction at tube ends, energy absorbed by the actuators, and the hysteresis losses of axial deflections and lateral tube deflections.

Figure 4:
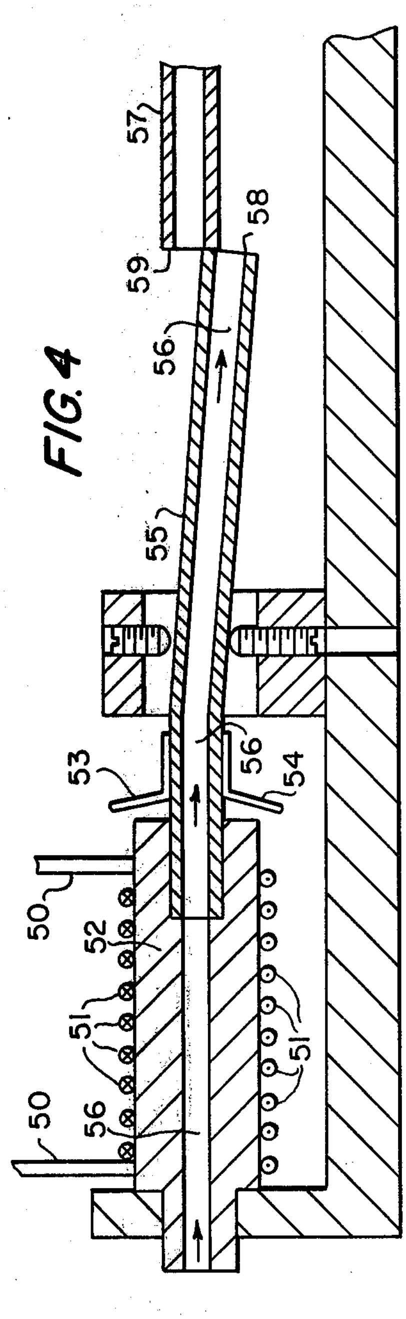
FIG. 4 shows a cross sectional view of another embodiment of this invention wherein the tube ends are cut off square and an axial separation actuator is used to force the tube ends together to form a tight seal.

FIG. 4 illustrates an embodiment of the invention whereby the two tubes of a fluid jet valve may be sealed tightly against each other while they are aligned and yet still be free to be deflected apart even though the tube ends are not tilted or slanted as are those shown in FIGS. 1, 2 and 3. In FIG. 4 the tube 55 is mounted on a block of material 52 which has a high coefficient of axial thermal expansion. The fluid flows through the channel 56 in the block 52 and the tube 55. The end surfaces 58 and 59 of the tubes 55 and 57 are flat and perpendicular to the longitudinal axes of these tubes. In FIG. 4 the tube 55 is shown in a deflected position relative to tube 57. The lead in wires 50 supply electrical current to the heater coil 51 which heats up the block 52 causing it to expand. When the current is turned off, the block 52 will contract. The tube 55 is made of a piezoelectric material which will be deflected when actuated by voltages applied to electrodes 53 and 54. While in operation, when the tube 55 is deflected so that the end surface 58 is not aligned with the end surface 59 of tube 57, there will be no current flowing through the heating coil 50 and the block 52 will be relatively cool. When the tube 55 is not deflected and thus the end surface 58 is aligned opposite the end surface 59 of tube 57, current will flow through the heating coil 51 to cause the block 52 to heat up and expand. The expansion of block 52 will exert a force through the tube 55 to force the tube end surfaces 58 and 59 together to form a tight seal. When it is desired to deflect the tube 55 again, the current through the heating coil will be turned off allowing the block 52 to cool down and contract and thus to pull the tube 55 far enough away from the tube 57 so that it may be deflected without binding against the end 59 of tube 57. Alternatively, as shown in FIG. 6 the block could be made of a stack of piezoelectric discs 43 which will exert axial forces on the tube 55 whenever the discs are activated. With this alternative, the heating coils 51 would be unnecessary. The stack of piezoelectric discs 43 are supported by the bracket 42 and flexible retaining ring 46. The piezoelectric discs are activated by way of the input leads 44 and 45.

Whereas the embodiments of the invention shown in FIGS. 1, 2 and 3 have curved surfaces, the invention could also be built with flat tube end surfaces such as shown in FIG. 5. If a continuing lateral closing force is applied between the two tubes 40 and 41, a tight seal will be formed between them. The flat end surfaces need to be tilted at a larger angle than do the curved end surfaces in order to prevent the opposing tube ends from binding against each other. The average tilt angle of the curved tube end surfaces in FIG. 3, $\beta$, may be smaller than the tilt angle $\alpha$ of the flat tube end surfaces shown in FIG. 5. The use of smaller tilt angles for the tube ends will result in a tighter seal and less leakage.

Obviously many modifications and variations of this invention are possible in light of the above teachings. It is therefore to be understood that within the scope of the appended claims the invention may be practiced otherwise than as specifically described.

What is claimed is:

1. A fluid jet transfer valve comprising:

two tubes with at least one of the tubes being a cantilevered tube, the cantilevered tube having a stationary end and a movable end, each of the two tubes having an open end with the movable end of the cantilevered tube also being the open end, and with the open ends being positionable to engage each other;

a source of pressurized fluid connected to one of the tubes;

a lateral deflection means for producing relative movement between the open ends of the tubes with the movements of the tube ends being restricted to paths which lie within a single plane surface and which are approximately arcs of tangent but non-overlapping circles with the arcs passing through a central point where the open tube ends are coaxially aligned with each other;

tube end surfaces on each of the open tube ends with the positions of the tubes adjusted so that the open tube ends will be in firm contact when coaxially aligned with each other, with the tube end surfaces tilted so that the open tube ends will be free to move apart without binding against each other, with the tube end surfaces formed with complementary shapes so as to produce a tight seal between the two open tube ends when they are coaxially aligned with each other and with almost all of each said tube end surfaces on each said open tube end being positioned along the intersection of the tube with two semi-cylindrical surfaces which are perpendicular to the plane surface within which the open tube end moves when it is laterally deflected, with approximately half of each tube end surface being concave relative to the rest of the tube and approximately half of each tube end surface being convex relative to the rest of the tube such that the tube ends may move away from each other in one direction but cannot pass each other.

2. A fluid jet transfer valve comprising:

a transmitting fluid channel connected to a source of high pressure fluid;

a receiving fluid channel which receives fluid from the transmitting fluid channel;

deflection means for causing said transmitting and receiving fluid channels to be deflected laterally so they they are misaligned coaxially and fluid will not flow from one to the other;

alignment means for maintaining the transmitting and receiving fluid channels coaxially aligned so that fluid will flow from one to the other whenever the deflection means is not activated;

said alignment means constituting the interface means between said transmitting and receiving channels which causes said channels to seal tightly together when they are coaxially aligned and allows them to move apart freely when they are laterally deflected, said interface means comprising tilted end surfaces on the fluid channels with the two end surfaces having complimentary shapes, with almost all of each said tilted channel end surface being positioned along the intersection of the channel with two semi-cylindrical surfaces which are perpendicular to the plane surface within which the channel moves when it is laterally deflected, with approximately half of each channel end surface being concave relative to the rest of the channel and with approximately half of each channel end surface being convex relative to the rest of the channel.

3. A fluid jet transfer valve comprising two tubes for transmitting pressurized fluid therebetween, an end of one of said tubes positioned adjacent an end of the other of said tubes, each of said tubes having a longitudinal axis;

means for pivoting at least one tube about a pivot axis between a closed position, wherein said longitudinal axes are coaxially aligned and said adjacent tube ends are disposed in abutting relationship, and an open position wherein said longitudinal axes are non-aligned and said adjacent tube ends are spaced apart;

each of said tube ends having an end wall essentially comprising a concave and a convex surface portion, each said surface portion having an axis of generation positioned generally parallel to its pivot axis, such convex and concave surfaces of one tube end wall generally conforming to and mating in sealing relationship with respective concave and convex surfaces on the other tube end wall in the closed position.

4. The valve of claim 3 wherein the distance between the respective pivot axis and the concave surface portions of one tube end wall is greater than the distance between such respective pivot axis and the convex surface portions of said one tube end wall.

5. The valve of claim 3 wherein the distance between the respective pivot axis and the concave surface portions of one tube end wall is less than the distance between such respective pivot axis and the convex surface portions of said one tube end wall.

6. The valve of claim 3 wherein the distance between the respective pivot axis and the surface portions of one tube end wall is greater than the radius of curvature of respective said concave and convex surface portions.

7. The valve of claim 3 wherein the distance between the respective pivot axis and the surface portions of one tube end wall is equal to the radius of curvature of respective said concave and convex surface portions.

* * * * *